United States Patent
Hasson et al.

(10) Patent No.: US 6,667,999 B2
(45) Date of Patent: Dec. 23, 2003

(54) COOLING OF HIGH POWER LASER SYSTEMS

(75) Inventors: Victor Hasson, Winchester, MA (US); Hsian P. Chou, Winchester, MA (US)

(73) Assignee: Textron Corporation, Wilmington, MA (US)

(*) Notice: Subject to any disclaimer, the term of this patent is extended or adjusted under 35 U.S.C. 154(b) by 98 days.

(21) Appl. No.: 09/932,869

(22) Filed: Aug. 17, 2001

(65) Prior Publication Data

US 2003/0063638 A1 Apr. 3, 2003

(51) Int. Cl.[7] ............................................... H01S 3/042
(52) U.S. Cl. ......................................................... 372/36
(58) Field of Search ............................................ 372/36

(56) References Cited

U.S. PATENT DOCUMENTS

| | | | |
|---|---|---|---|
| 4,749,842 A | 6/1988 | Kane et al. ................. 219/201 |
| 4,969,155 A | 11/1990 | Kahan ........................ 372/70 |
| 5,115,445 A | 5/1992 | Mooradian ................... 372/75 |
| 5,317,585 A | 5/1994 | Gregor ....................... 372/35 |
| 5,363,391 A | 11/1994 | Matthews et al. ............. 372/36 |
| 5,488,619 A | 1/1996 | Injeyan et al. ............... 372/12 |
| 5,774,488 A | 6/1998 | Kmetec ....................... 372/69 |
| 5,781,573 A | 7/1998 | Basu ......................... 372/34 |
| 5,796,766 A | 8/1998 | Hargis et al. ................ 372/36 |
| 5,898,211 A | 4/1999 | Marshall et al. ............. 250/601 |
| 6,101,201 A | 8/2000 | Hargis et al. ................ 372/36 |
| 6,330,256 B1 * | 12/2001 | Byren et al. ................. 372/21 |
| 6,385,220 B1 * | 5/2002 | Miller et al. ................ 372/34 |

FOREIGN PATENT DOCUMENTS

| | | | |
|---|---|---|---|
| JP | 01128553 A | 5/1989 | ............... 257/720 |
| JP | H5-267753 | 10/1993 | |

OTHER PUBLICATIONS

C.D. Nabors, A. Sanches, and A. Mooradian, *High–Power, Continuous–Wave, Nd:YAG Microchip Laser Array*, 1992 Optical Society of America

* cited by examiner

*Primary Examiner*—Paul Ip
*Assistant Examiner*—Jeffrey N Zahn
(74) *Attorney, Agent, or Firm*—Weingarten, Schurgin, Gagnebin & Lebovici LLP

(57) ABSTRACT

A method and apparatus for cooling a high power laser oscillator or amplifier is disclosed in which a plurality of laser gain media that are configured such that the width of the media is greater than the thickness of the media, are sandwiched between pairs of optically transparent materials having high thermal conductivity. In this way, a shortened thermal path is created from the face surface of the laser gain media axially via the optically transparent heat conductor to an external heat exchange system. This provides an increased level of cooling of the interior of the laser gain media and avoids the deleterious effects caused by over heating of the laser gain media particularly with large effective cross sections desired for high power and/or high pulse repetition and high pulse energy operation.

25 Claims, 4 Drawing Sheets

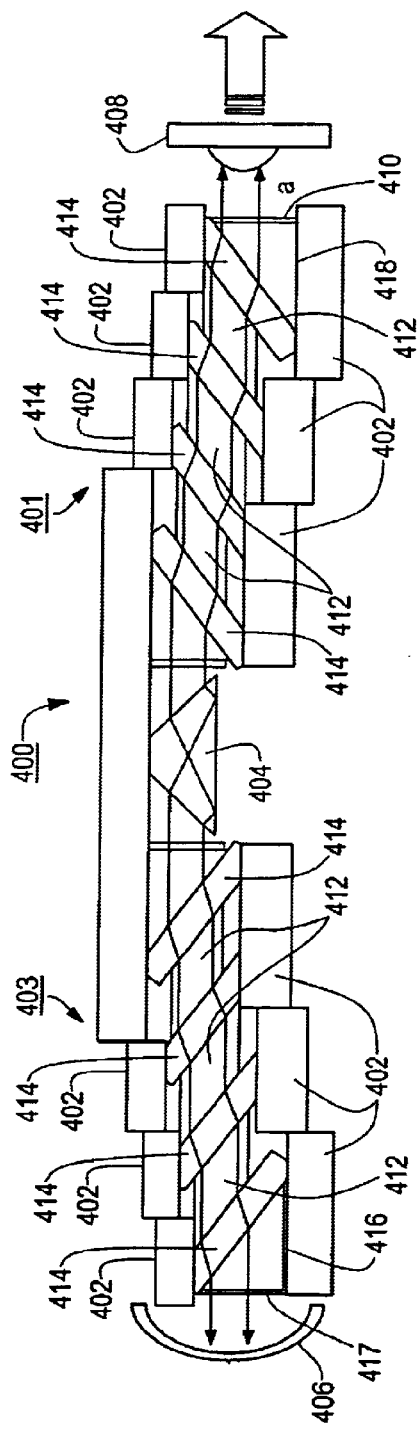
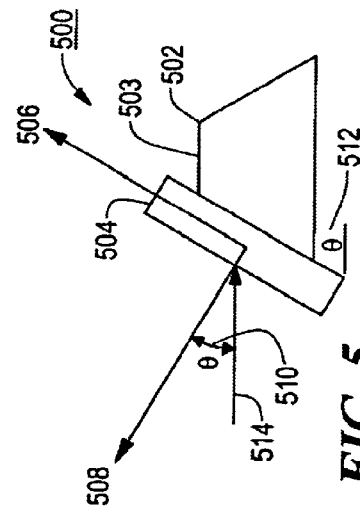
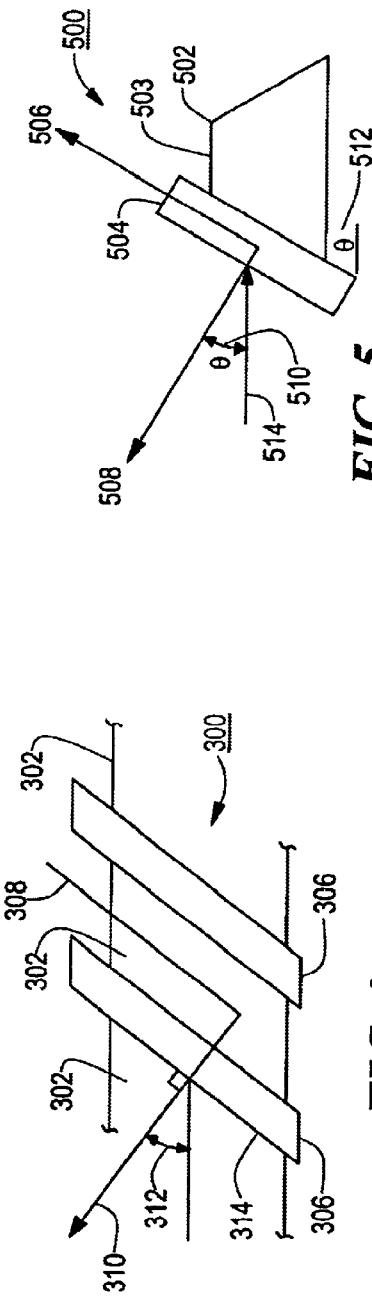

COOLING OF HIGH POWER LASER SYSTEMS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Optically pumped lasers are well known in the art and are used as both laser oscillators and laser amplifiers ("pumped laser"). An optically pumped laser converts pump energy at a pump wavelength into a coherent electromagnetic wave ("laser energy") at a second wavelength either as a free running laser oscillator, or under control of an input signal as a laser amplifier. Pump energy that is absorbed and not converted into laser energy becomes heat and must be removed.

A pumped laser is typically constructed of a laser gain material that has a low thermal conductivity. The action of pumping a laser gain medium with energy produces stimulated emission of laser energy within the laser gain medium. Different lasers have different operating characteristics. For example, lasers can be operated in a continuous wave (CW) mode or in a pulsed mode. Accordingly, as the amount of pump power increases, and the pulse rate increases, progressively larger amounts of heat will need to be removed from the pumped laser. Because the thermal conductivity of the typical pumped solid-state laser material is low, in a high power and/or high pulse rate pumped laser, heat will not be conducted away from the laser gain medium at a sufficient rate. As such, thermal damage to the pumped laser may occur. For example, optical distortion of the laser output energy due to thermal and stress related birefringence effects in the laser gain medium may occur. A high power pumped laser requires a solid-state laser gain medium having a large cross section to limit flux (W/cm$^2$) and fluence (J/cm$^2$) related damage and non-linear phenomena.

Typically, pumped lasers are surface cooled, that is, heat is conducted away from the surface of the pumped laser gain medium. In a conventional pumped laser configuration, the gain medium is configured as a rod, in which the length of the rod is larger than the diameter of the rod. In this conventional configuration, the thermal time constant, which is the time for the rod to achieve thermal equilibrium across the entire face, i.e., that the temperature of the rod is equal from the center of the rod to the edge of the rod is approximately proportional to the reciprocal of the diameter squared of the rod divided by a thermal diffusivity constant. Thus for high power applications in which larger diameters are required, efficient heat transfer away from the pumped laser gain medium is difficult to achieve. The approach being used currently is to rely on this slab-like cross section and side heat removal to achieve the required cross section and requisite heat transfer respectively. This asymmetry has several disadvantages from a materials standpoint and also from a beam quality standpoint.

Therefore it would be desirable to provide a pumped laser that includes a heat transfer system that is able to cool the pumped laser at high power and/or high pulse rates and energies over large effective cross sections.

BRIEF SUMMARY OF THE INVENTION

A method and apparatus for cooling a high power solid state laser oscillator or amplifier is disclosed in which a plurality of laser gain media that are configured such that the width of the media is greater than the thickness of the media, are sandwiched between pairs of optically transparent heat transfer media having high thermal conductivity. In this way, a shortened thermal path is created from the face surface of the laser gain media axially via the optically transparent heat transfer medium to an external heat exchange system. This provides an increased level of cooling of the interior of the laser gain media with large effective diameters and cross sections and avoids the deleterious effects caused by overheating of the laser gain media during high power and/or high pulse repetition operation. It also effectively avoids the highly asymmetric structures associated with various slab-like geometries.

In particular, an apparatus for cooling a laser gain element includes a laser element having a cross section with first and second surfaces and a longitudinal axis defined therebetween, and third and fourth surfaces and a transverse axis defined therebetween. The laser gain element has a longitudinal dimension and a transverse dimension wherein the transverse dimension is greater than the longitudinal dimension. A pump source is optically coupled to the laser gain element, the pump source providing pump energy at a pump wavelength, wherein when pumped by the pump source, the laser gain element emits laser energy at a laser wavelength. In one aspect of the invention, the pump source is optically coupled to the laser element parallel to the first axis. An optically transparent heat transfer medium (OTH) is optically and thermally coupled to the first surface of the laser element, wherein the OTH is substantially optically transparent at the laser and pump wavelengths of interest. A heat transfer system including a heat transfer medium and/or heat exchanger is thermally coupled to the OTH. In this way, the heat generated within the laser element flows into the OTH from the laser element substantially parallel to the longitudinal axis. In one aspect of the invention, the OTH is a layer of diamond.

In another embodiment, a laser is disclosed that includes a laser cavity having a first reflective surface and a first partially reflective surface. A plurality of laser elements are optically coupled to one another, each having a cross section having first and second axes and first and second surfaces parallel to the first axis. In addition, each of the plurality of laser elements includes first and second dimensions that parallel the first and second axes respectively wherein the first dimension is greater than the second dimension. Also, each of the plurality of laser elements is coaxial along the second axis. In one aspect the laser element is a solid state gain medium, wherein the solid state gain medium is Nd:YAG. The laser also includes a pump source optically coupled to the laser gain medium, the pump source providing pump energy at a pump wavelength. The plurality of laser elements disposed within the laser cavity between the first and second reflective surfaces and configured and arranged to receive pump energy and to generate a laser emission parallel to the second axis. The laser further includes a plurality of optically transparent heat transfer media (OTH), each OTH optically and thermally coupled to the first surface of a corresponding one of the plurality laser elements, wherein the laser emission passes through each OTH, the OTH being substantially transparent at the laser wavelength and the pump wavelength. The laser includes a heat transfer system and/or heat exchanger thermally coupled to the OTH In this way, the heat generated within the laser element flows primarily into the OTH from the laser element substantially parallel to the longitudinal axis, where it is removed and dissipated by the heat transfer system.

This laser can further include an index matching layer disposed between the first surface of the laser element and the OTH, wherein the index matching layer has an index of refraction that is the square root of the product of the index of refraction of the laser element and the index of refraction of the OTH, and wherein the index matching layer is comprised of $Ta_2O_5$.

In another embodiment a laser is disclosed that includes a plurality of laser elements optically coupled to one another. Each of the laser elements has a cross section having a cross section with first and second surfaces and a longitudinal axis defined therebetween, and third and fourth surfaces and a transverse axis defined therebetween. The laser gain element has a longitudinal dimension and a transverse dimension wherein the transverse dimension is greater than the longitudinal dimension. In one embodiment, the laser element is a solid state gain medium, and can be Nd:YAG. The laser also includes a laser cavity having a first reflective surface and a first partially reflective surface, and a pump source optically coupled to the laser gain element. The pump source is configured and arranged to provide pump energy at a pump wavelength. The plurality of laser elements are disposed within the laser cavity between the first and second reflective surfaces and configured and arranged to receive pump energy and to generate a laser emission parallel to the second axis. The laser also includes a plurality of optically transparent heat transfer media (OTH), each OTH optically and thermally coupled to the first surface of a corresponding one of the plurality laser elements, wherein the laser emission passes through each OTH, the OTH being substantially transparent at the laser wavelength and the pump wavelength. Each of the plurality of laser gain elements is configured and arranged such that the angle of incidence for the laser emission entering an adjacent laser element is substantially equal to the Brewster angle. A heat transfer system including a heat transfer medium is thermally coupled to the OTH. In this way, the heat generated within the laser element flows primarily into the OTH from the laser element substantially parallel to the longitudinal axis, and is dissipated by the heat transfer system.

In another embodiment, a laser is disclosed that includes a plurality of laser elements optically coupled to one another, each with a cross section with first and second surfaces and a longitudinal axis defined therebetween, and third and fourth surfaces and a transverse axis defined therebetween. The laser elements each have a longitudinal dimension and a transverse dimension, wherein the transverse dimension is greater than the longitudinal dimension. The laser gain element can be a solid state gain medium such as Nd:YAG. The laser also includes a laser cavity having a first reflective surface and a first partially reflective surface and a pump source optically coupled to the laser gain element, the pump source providing pump energy at a pump wavelength, wherein the plurality of laser elements is disposed within the laser cavity between the first and second reflective surfaces and configured and arranged to receive pump energy and to generate a laser emission parallel to the second axis. A plurality of optically transparent heat transfer media (OTH), are each optically and thermally coupled to the first surface of a corresponding one of the plurality laser elements such that the laser emission passes through each OTH, the OTH is substantially transparent at the laser wavelength and the pump wavelength. The first and second surface of each of the plurality of laser elements are angled such that angle of incidence for the laser emission entering from an adjacent laser element is substantially equal to the Brewster angle. The laser further includes a heat transfer system including a heat transfer medium thermally coupled to the OTH and a heat exchanger thermally coupled to the heat transfer medium, wherein heat generated within the laser element flows into the OTH from the laser element and dissipated by the heat transfer system.

Other forms, features and aspects of the above-described methods and system are described in the detailed description that follows.

BRIEF DESCRIPTION OF THE SEVERAL VIEWS OF THE DRAWING

The invention will be more fully understood by reference to the following Detailed Description of the Invention in conjunction with the Drawing of which:

FIG. 3 is a side cross-sectional view of one embodiment of a Brewster angle gain cell;

FIG. 4 is a side cross-sectional view of a laser incorporating the embodiment of the Brewster angle gain cell of FIG. 3;

FIG. 5 is a side cross-sectional view of a second embodiment of a Brewster angle gain cell;

DETAILED DESCRIPTION OF THE INVENTION

Figure 1:
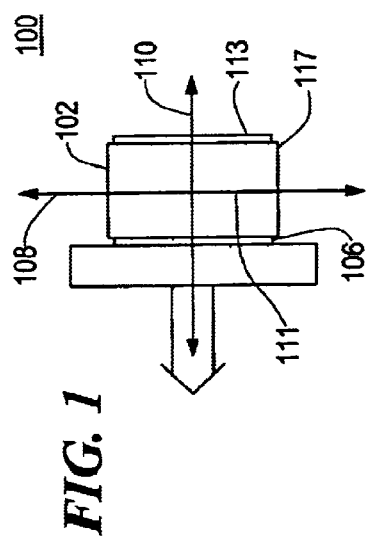
FIG. 1 is a side cross-sectional view of one embodiment of an index matched gain cell.
Figure 2:
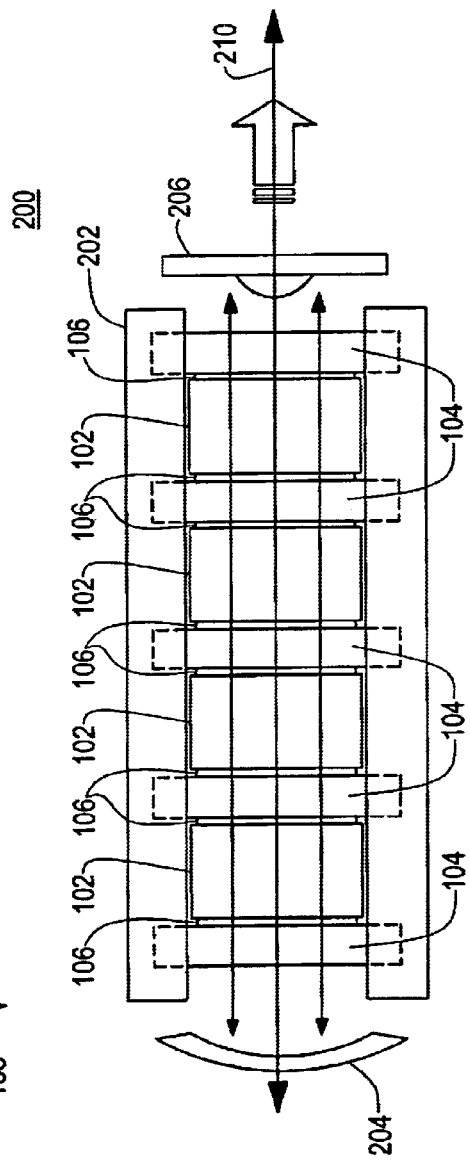
FIG. 2 is a side cross-sectional view of a laser incorporating the index matched gain cell of FIG. 1.
Figure 6:
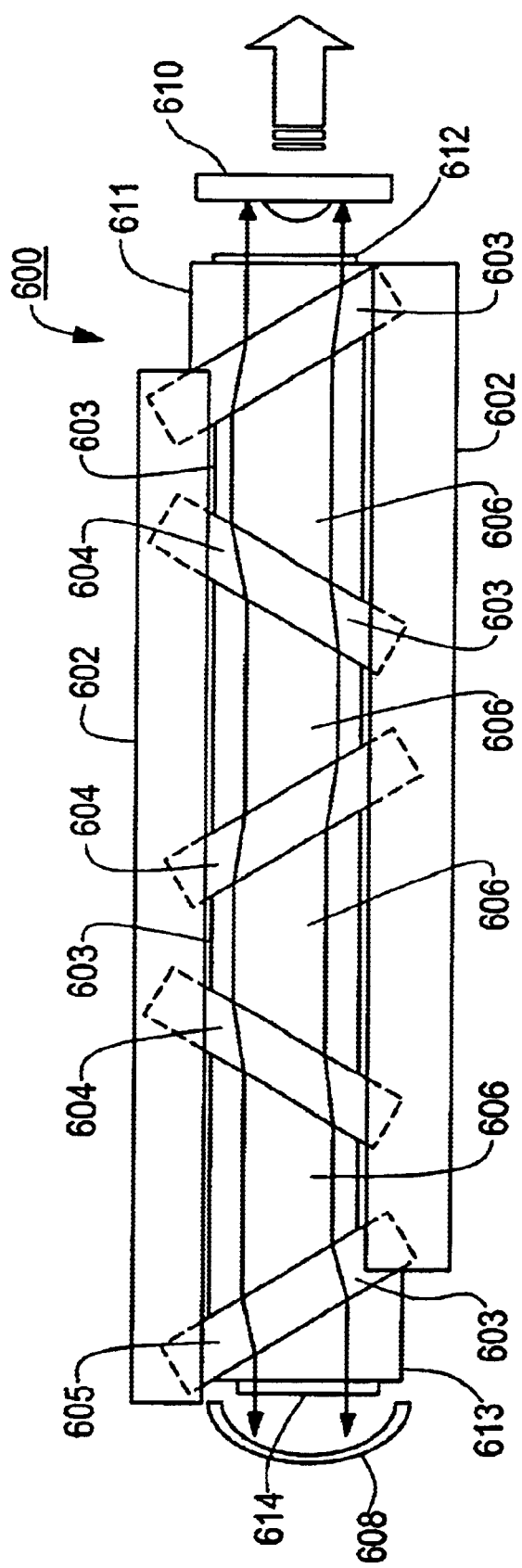
FIG. 6 is a side cross-sectional view of a laser incorporating the embodiment of the Brewster angle gain cell of FIG. 5.
Figure 7:
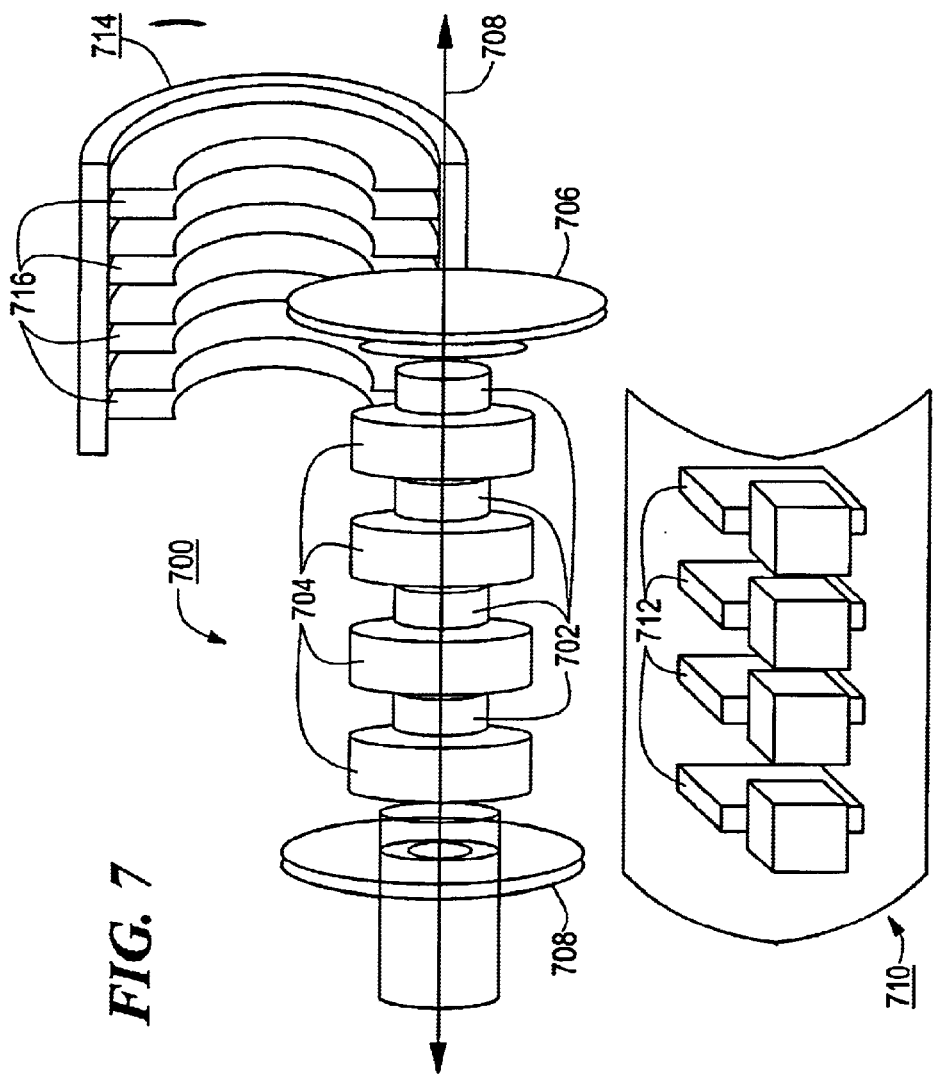
FIG. 7 is a plan view of a laser including a heat transfer jacket incorporating the index matched gain cell of FIG. 1.

The various embodiments of the method and apparatus for cooling high power laser system will be described with respect to FIGS. 1–7. FIGS. 1 and 2 describe a first embodiment of a pumped laser employing an index matching layer sandwiched between a laser gain media and the adjacent optically transparent heat transfer media. FIGS. 3 and 4 depict a second embodiment employing a first Brewster angle cavity configuration that utilizes a first geometric configuration to reduce reflections between laser gain media and the adjacent optically transparent heat transfer media. FIGS. 5 and 6 depict a second Brewster angle cavity configuration that utilizes a second geometric configuration to reduce reflections between laser gain media and the adjacent optically transparent heat transfer media. FIG. 7 depicts an index matched laser including a heat exchanger.

FIG. 1 is a first embodiment of a laser gain cell 100 that includes a laser gain medium 102 optically and thermally coupled to an optically transparent heat transfer medium (OTH) 104 via an index matching layer 106. The gain cell 100, shown in cross section, includes a first surface 111, a second surface 113, a third surface 115 and a fourth surface 117. A longitudinal direction shown by axis 110 is defined between the first and second surfaces 111 and 113 respectively of the laser gain medium 102 and a transverse direction shown by axis 108 is defined between the third and fourth surfaces 115 and 117. The cross section of the gain cell 100 depicted in FIG. 1, includes the laser gain medium 102 having a longitudinal dimension and a transverse dimension, wherein the transverse dimension is greater than the longitudinal dimension. The optical axis of the laser gain medium 102 is co-linear with the longitudinal direction 110.

The gain medium 102 can be a solid state gain medium such as a Nd:YAG material or a piece of glass that has been doped with one or more optically active dopants or dye impregnated plastics. These materials are able to provide a population inversion when excited by a pump energy source (not shown). Two common optically active dopants that may be used include Erbium and Neodymium. In addition, other rare earth materials may be used as dopants depending on the level of amplification, noise, bandwidth, and other physical characteristics required by the particular application. In addition, rare earth materials may use dopants to improve pumping or lasing performance. For example, Ytterbium and Erbium may be used together to provide particular lasing wave lengths at particular pump energies. Other rare earth materials may be used as optically active dopants either individually or in pairs within the laser gain medium to achieve desired characteristics for a given application.

The laser gain medium 102 can be configured in various geometric shapes. A preferred shape for the laser gain medium 102 is a disk having a diameter D and a thickness t, wherein D is greater than t. In this preferred embodiment the heat transfer rate from the laser gain medium is proportional to the reciprocal of the square of the thickness. In addition, the dominant heat flow path will be substantially axial from the first surface of the laser gain medium 102 along the second axis 110. This advantageously provides for a greater rate of heat flow and a shortening of the heat flow path.

As is known in the art, the action of pumping a laser gain medium with energy produces stimulated emission of laser energy within the laser gain medium. The pump source (not shown) can be a solid-state laser or other laser than can provide sufficient pump laser energy at a pump wavelength selected in concert with the laser gain medium 102 to provide a desired laser output power at a predetermined laser wavelength. Alternatively, spectrally filtered flash lamps and arc lamps of appropriate wavelengths can be used as pump sources.

Because only a portion of the pumped energy received by the laser gain medium is used in the stimulated emission process, the energy absorbed but not used to promote stimulated emission produces heat within the laser gain medium. The heat within the laser gain medium can cause, among other problems, optical distortion of the laser output energy due to thermal and stress related birefringence effects in the laser gain medium 102. In the embodiment illustrated in FIG. 1 the gain cell 100 includes an OTH 104 that is optically and thermally coupled to the laser gain medium 102. The OTH 104 should be substantially optically transparent at both the lasing wavelength and the pump wavelength. Ideally the OTH 104 should have a very high thermal conductivity compared to the active medium. For example, a laser gain element made of YAG crystal has a heat conductivity of approximately 14 W/m-C as compared to silver which has a heat conductivity of approximately 419 W/m-C, and diamond which has a heat conductivity of approximately 1350 W/m-C. As can be observed, diamond is clearly a preferred material for the OTH 104 since it is both transparent at the pump and laser wavelengths of interest as well as having a heat conductivity two orders of magnitude larger than the active YAG medium. The OTH 104 is optically and thermally coupled to the first face surface of the laser gain medium by pressure contact, optical fusing, or other means of coupling that provides the necessary optical transmission and heat conductivity. The laser output is passed, along the optical axis through the OTH. The OTH does not absorb significant heat from the laser output since the OTH is substantially transparent at that frequency. Heat from the face surface of the laser gain medium 102 is transferred from the first surface axially and transported by the highly conductive OTH 104 to a heat transfer medium or heat exchanger (not shown) where the heat can be dissipated. This effectively cools the interior of the laser gain medium and avoids the problems associated with overheating described above. In all of the embodiments discussed herein, the OTH should have a good optical transparency at the pump wavelength and laser wavelength of interest. However, some absorption of the pump energy is typical and can be accommodated by the OTH 104 and the heat exchanger. In addition, the OTH should have a surface quality compatible with a high quality laser beam having both low scattering and minimal beam distortion in a beam quality sense.

As shown in FIG. 1, an index matching anti-reflection layer 106 can be placed between the laser gain medium 102 and the OTH 104 to prevent reflections from occurring at the interface thereof. Any reflections of laser energy from the interface will concomitantly attenuate the strength of the laser emission passing through the interface and may cause other problems that reduce the laser/amplifier power that affects the spectral content of the output laser emission. The index matching layer is a predetermined thickness of a material having an index of refraction that is the square root of the product of the index of refraction, $n_1$, of the laser gain medium 102, and the index of refraction, $n_2$, of the OTH 104. In one embodiment, the predetermined thickness is an odd multiple of a quarter-wavelength of the laser wavelength of interest. In one embodiment in which a YAG laser gain medium having an index of refraction, $n_1=1.82$, and a diamond OTH having an index of refraction, $n_2=2.4$, are used, a suitable index matching material is a quarter-wavelength thick layer of $Ta_2O_5$ having an index of refraction, $n_3$, equal to 2.09. Other materials may be used as the anti-reflection coating that satisfy or approximately satisfy the above criteria for a given system's requirements.

FIG. 2 depicts a laser 200 that utilizes a plurality of the gain cells, depicted in FIG. 1, to increase the length and associated volume of the laser gain medium and to provide for cooling the laser gain media via the optically transparent heat transfer media disposed within a sandwich arrangement as discussed above. In this way the laser oscillator 200 produces a high power laser emission having a good beam quality and an increased power efficiency. This is accomplished by suppressing the thermally induced optical distortions of the laser beam through the rapid transfer of heat from the faces of the laser gain media via the optically transparent heat transfer medium. The laser 200 includes a laser cavity defined by mirrors 204 and 206 in which mirror 204 is the primary mirror and mirror 206 is the feedback mirror. The laser cavity includes a plurality of laser gain cells optically coupled together along a common optical axis 210 such that the laser energy produced in the first gain cell, which is near primary mirror 204, passes through adjacent gain cell stages as the laser energy progresses toward the laser output 208. As discussed above, each laser gain cell stage includes an OTH 104 optically and thermally coupled to a first face surface of a laser gain medium disk 102 via an index matching layer 106. The laser gain stages are aligned side by side on a common optical axis 210. As discussed above, it is important to minimize the reflections that occur at the interface between two materials having different indexes of refraction. Accordingly, the index matching layer 106 is selected as described above to avoid reflections of laser energy at the interface between each laser gain medium disk 102 and each OTH 104. Each OTH 104 is further thermally coupled to a optically transparent heat transfer medium 202 that is further coupled to a heat exchange system (not shown). In operation one or more pump laser sources (not shown) are used to provide the population inversion for the laser gain medium 102. The pump source (not shown) can be one or more arc lamps or flash lamps configured and arranged to couple sufficient pump power to the laser gain medium. Alternatively, an array of laser sources such as laser diodes or other solid state lasers, optically aligned and coupled to the plurality of laser gain media within the laser cavity. In another alternative embodiment, the pump source can be one or more lasers coupled to the various laser gain media within the laser cavity via optical fibers. In this embodiment the laser pump sources could be remotely located and effectively routed into a position for near optimum coupling of pump energy into the laser gain media 102.

As discussed above, it is important to minimize the reflections of the laser emissions at the interface between the laser gain medium and the OTH. FIG. 3 depicts a laser gain cell 300 which nearly eliminates reflections of properly polarized laser energy at the interfaces between a laser gain medium and an OTH by ensuring that the laser energy has an angle of incidence that is substantially equal to the Brewster angle. As will be discussed below, there will be substantially no reflection from an interface for a properly polarized laser emission that is incident at the Brewster angle.

As depicted in FIG. 3, gain cell 300 includes a plurality of laser gain media 302 that have sandwiched therebetween a first and second OTH 304 and 306 respectively. The gain cell 300 further includes a first axis 308 and a second axis 310 that are substantially perpendicular to one another, wherein the axis 310 is normal to the surface 314. Laser energy is incident at surface 314 of OTH 304 along optical axis 318 and forms angle 312 with the axis 310. Angle 312 is substantially equal to the Brewster angle of the OTH material and the laser gain medium 302. The Brewster angle, which is also known as a polarizing angle, is equal to the arctangent of the index of refraction of the OTH divided by the index of refraction of the laser gain medium 302. The Brewster angle is significant in that, if light is incident at this angle the reflected light will have no component in the plane of incidence. This means that for properly polarized laser energy there will be no reflectivity from the interface between a laser gain medium 302 and the surface 314 of OTH 304. Small deviations about the Brewster angle will achieve substantially the same effect. As discussed above, to avoid the problems associated with thermal stress, the laser gain media 302 includes a longitudinal dimension, substantially parallel to the axis 310, and a transverse dimension, substantially parallel to the axis 308. To facilitate the cooling of the interior laser gain media 302, the transverse dimension is greater than the longitudinal dimension.

As will be discussed in more detail below, the gain cell 300 typically is used in a laser device employing a plurality of adjacent gain cells having a common optical axis 318. Accordingly, each OTH, except the OTHs at each end, is sandwiched between two adjacent layers of the laser gain medium. From optics, Snell's law describes the change in the angles of refraction as light travels between two different media. Where one medium is sandwiched between two layers of identical media, the light in the two identical media will propagate along parallel paths. Thus light entering the OTH from a first laser gain medium, from either direction, which is at the Brewster angle will pass into the adjacent laser gain medium along an optical axis that will ensure an angle of incidence at the next OTH substantially equivalent to the Brewster angle. Accordingly, for a properly polarized laser emission, there will be no reflection at any interface between a given laser gain medium and an adjacent OTH.

FIG. 4 illustrates a second embodiment of a high laser system cooled using optically transparent heat transfer media. In this embodiment the laser 400 includes optically transparent heat transfer media 402 that are thermally coupled to optically transparent heat transfer media (OTH) 414. The optically transparent heat transfer media 414 are sandwiched between adjacent laser gain media 412. As discussed above, a heat dissipation or heat exchanger (not shown) is coupled to the plurality of OTH 402 to remove heat from the laser cavity.

A dove prism 404 is used to align the laser energy traveling between a first section 401 and a second section 403. A first alignment prism 416, is used to properly align the laser energy for reflection from primary mirror 406. A first anti-reflection layer 417 is coated on the output face of the first alignment prism 416 to prevent reflections of the laser energy at the interface between the alignment prism 417 and the cavity environment. A second alignment prism 418 is used to properly align the laser energy for reflection and transmission through feedback mirror 408. A second anti-reflection coating 410 is provided on the output face of alignment prism 418 to prevent reflections of laser energy at the interface between the alignment prism 418 and the cavity environment. The first and second anti-reflection coatings 417 and 410 respectively can be index matching quarter wavelength coatings as described above with reference to FIG. 1. Because the optical axis is not collinear with the second axis of the laser gain elements, light will be shifted due to refractive effects at the interface between the laser gain media and the optically transparent heat transfer media. The amount of shifting is dependent upon the thickness of the optically transparent heat transfer media. Due to this shifting, adjacent laser gain elements must be physically shifted to maintain a constant optical axis and path through the laser cavity.

In operation, one or more pump laser sources are used to provide the population inversion for the laser gain medium 412. The pump source (not shown) can be one or more arc lamps or flash lamps configured and arranged to couple sufficient pump power to the laser gain medium. Alternatively, an array of laser sources such as laser diodes or other solid state lasers, optically aligned and coupled to the plurality of laser gain mediums within the laser cavity. In another alternative embodiment, the pump source can be one or more lasers coupled to the various laser gain mediums within the laser cavity via optical fibers. In this embodiment, the laser pump sources could be remotely located and effectively routed into a position for near optimum coupling of pump energy into the laser gain media 412.

FIG. 5 depicts a gain cell 500 for use in a second Brewster angle cavity configuration. The gain cell 500 includes a frustum shaped laser gain medium 502 optically and thermally coupled to a optically transparent heat transfer medium 504. The angle 512 of the frustum shaped laser gain medium 502 is related to the Brewster angle of the optically transparent heat transfer medium as $\theta=90-\theta_B$, where $\theta_B$ is the Brewster angle. As can be seen the angle of incidence 510 formed between the incoming laser emission 514 and second axis 508 will be at the Brewster angle. Accordingly, as discussed above for a properly polarized laser emission there will be no reflection at the interface of an OTH incoming laser emission from a laser gain medium in either direction.

FIG. 6 depicts a second Brewster angle cavity configuration 600 that includes an optical heat transfer medium 602 thermally coupled to optically transparent heat transfer media 604 that are optically and thermally coupled to laser gain media 606. As depicted in FIG. 6 the laser gain medium 606 are placed alternating in the orientation of the first surface 603. An alignment prism 612 is optically coupled to the last OTH 605, which is closest to the feedback mirror 610, in order to properly align laser emission for the proper reflection from the primary mirror 608. An anti-reflection coating 614 is placed on the output surface of the alignment prism 613 to avoid reflections from light reflected from the primary mirror 608. An alignment prism 611 is optically coupled to the OTH 617 to properly align laser energy for reflection and transmission from and through the feedback mirror 610. An anti-reflection coating 612 is placed on the output surface of the alignment prism 611 to prevent reflections of laser energy entering the alignment prism after being reflected by the output mirror 610. The first and second anti-reflection coatings 614 and 612 respectively can be index matching quarter wavelength coatings as described above with reference to FIG. 1.

As discussed above, a heat dissipation or heat exchanger (not shown) is coupled to the plurality of OTH 604 to remove heat from the laser cavity. In operation one or more pump laser sources are used to provide the population inversion for the laser gain medium 606. The pump source (not shown) can be one or more arc lamps or flash lamps configured and arranged to couple sufficient pump power to the laser gain medium. Alternatively, an array of laser sources such as laser diodes or other solid state lasers, optically aligned and coupled to the plurality of laser gain mediums within the laser cavity. In another alternative embodiment, the pump source can be one or more lasers coupled to the various laser gain mediums within the laser cavity via optical fibers. In this embodiment, the laser pump sources could be remotely located and effectively routed into a position for near optimum coupling of pump energy into the laser gain media 606.

FIG. 7 depicts one embodiment of a laser configuration compatible with the use of optically transparent heat transfer media for cooling a plurality of laser gain media. In particular, a laser cavity 700 includes a plurality of laser gain media 702, sandwiched between alternating layers of optically transparent heat transfer media (OTH) 704. As discussed below, each OTH 704 is optically and thermally coupled to each adjacent laser gain medium 702. A primary mirror 706 and a secondary mirror 708 define the laser cavity boundaries. Each of the laser gain medium 702 and each of the OTH 704 are aligned along a common optical axis 708, such that laser energy generated by one of the laser gain medium 702 will pass through one or more other laser gain medium 702 and OTH 704. The combination of the laser energy produced by each laser gain medium 702 in conjunction with the mirrors 706 and 708 create an output beam of laser energy. A pump source 710 that is comprised of a plurality of pump lasers 712 is optically coupled to the laser cavity, such that each laser gain medium 702 receives pump energy from at least one pump laser. In the illustrated embodiment, transverse pumping is preferably used to provide the pump energy to the laser gain media 702. Alternatively, optical fibers (not shown) may be used to couple pump energy from one or more pump laser sources to each of the plurality of laser gain media 704.

One-half of a cooling jacket and heat transfer medium 714 that removes excess heat from the laser is depicted in FIG. 7. The cooling jacket and heat transfer medium 714 includes a plurality of optically transparent heat transfer media 716 that are thermally coupled to the optically transparent heat transfer media 704. This provides a heat flow path away from the face surfaces of the laser gain media 702. The plurality of optically transparent heat transfer media 716 can be a single piece of material that is configured and arranged to match the shape of the OTH 704. This allows the maximum surface to surface contact and helps to ensure that the maximum heat coupling between the two heat transfer media is obtained. The cooling jacket can include a cooling medium for removing the excess heat transported via the optically transparent heat transfer media 704 and 716 away from the laser cavity. The cooling medium can include ambient air or forced convective air can be used. Alternatively, a thermally conductive gas such as helium can be used in conjunction with a heat exchanger (not shown). Liquid coolants could also be used in conjunction with a heat exchanger (not shown). The selection of the particular form of cooling system and the particular cooling medium should be based on the system requirements such as the laser power output, the laser pulse rate, the environment in which the laser is used, and other factors which dictate the magnitude and the rate at which the excess heat must be removed from the laser cavity.

It should be appreciated that although only the index matching laser configuration is depicted in FIG. 7, the first and second Brewster angle configurations could be used as well.

Those of ordinary skill in the art should further appreciate that variations to and modification of the above-described methods, apparatus and system for cooling various configuration of lasers may be made without departing from the inventive concepts disclosed herein. Accordingly, the invention should be viewed as limited solely by the scope spirit of the appended claims.

What is claimed is:

1. A laser gain cell comprising:
   a laser gain element with first and second spaced surfaces and a longitudinal axis normal thereto, and a peripheral surface extending between said first and second spaced surfaces and a transverse axis normal to said peripheral surface and said longitudinal axis, a longitudinal dimension defining the thickness of the laser gain element along the longitudinal axis and a transverse dimension defining the height of the laser gain element along the transverse axis of the laser gain element, wherein the height is greater than the thickness;
   a pump source optically coupled to the laser gain element, the pump source providing pump energy at a pump wavelength, wherein the laser gain element is operative to emit laser energy at a laser wavelength in response to said pump energy;
   an inline optically transparent heat transfer medium (inline OTH) having first and second opposing face surfaces, wherein said first face surface of said inline OTH optically and thermally coupled to the first surface of the laser element, wherein said inline OTH is substantially optically transparent at the pump wavelength and the laser wavelength, the OTH further including a peripheral surface extending between the opposing first and second surfaces;

a heat transfer system including a peripheral OTH thermally and optically coupled to the peripheral surface of the inline OTH, wherein the peripheral OTH is substantially optically transparent at the pump wavelength and the laser wavelength, and a heat exchanger thermally coupled to the peripheral OTH;

wherein heat generated within the laser gain element flows from the first face of the laser gain element into the inline OTH and through the inline OTH into the peripheral OTH for dissipation by the heat exchanger.

2. The apparatus of claim 1 wherein the pump source is optically coupled to the laser element parallel to the first axis.

3. The apparatus of claim 1 wherein the inline OTH and the peripheral OTH are comprised of diamond.

4. A laser, comprising:

a plurality of laser gain elements optically coupled to one another, with first and second spaced surfaces and a longitudinal axis normal thereto, and a peripheral surface extending between said first and, second spaced surfaces and a transverse axis defined normal to said peripheral surface and to said longitudinal axis, a longitudinal dimension defining the thickness of said laser gain element along said longitudinal axis and a transverse dimension defining the height of said laser gain element along said transverse axis wherein the dimension height of the laser gain element is greater than the thickness of the laser gain element, wherein each of the plurality of laser gain elements is configured and arranged coaxial along the longitudinal axis;

a laser cavity having a first reflective surface and a first partially reflective surface spaced apart from one another;

a pump source optically coupled to the plurality of laser gain elements, the pump source providing pump energy at a wavelength;

the plurality of laser gain elements disposed within the laser cavity between the first and second reflective surfaces and configured and arranged to receive pump energy and operative to generate a laser emission having a laser wavelength parallel to the longitudinal axis in response to said pump energy;

a plurality of inline optically transparent heat transfer media (inline OTH), each inline OTH having a first and second face surfaces, wherein said first face surface of said inline OTH optically and thermally coupled to the first surface of a corresponding one of the plurality laser elements, the inline OTH being substantially transparent at the laser wavelength and the pump wavelength, each of the plurality of OTH being coaxial on the longitudinal axis of the laser, the inline OTH further including a peripheral surface extending between said first and second face surfaces of said inline OTH;

a heat transfer system including a peripheral OTH thermally and optically coupled to the peripheral surface of one or more of the plurality of inline OTH, wherein the peripheral OTH is substantially optically transparent at the pump wavelength and the laser wavelength; and a heat exchanger thermally coupled to the peripheral OTH; and wherein heat generated within the laser gain element flows from the first face of the respective laser gain element into the inline OTH and through the inline OTH and into the peripheral OTH for dissipation by the said heat exchanger.

5. The apparatus of claim 4 wherein the laser element is a solid state gain medium.

6. The apparatus of claim 5 wherein the solid state gain medium is Nd:YAG.

7. The apparatus of claim 4 further comprising an index matching layer disposed between the first surface of the laser element and the OTH.

8. The apparatus of claim 7 wherein the index matching layer has an index of refraction that is the square root of the product of the index of refraction of the laser element and the index of refraction of the OTH.

9. The apparatus of claim 8 wherein the index matching layer is comprised of $Ta_2O_5$.

10. The apparatus of claim 4 wherein the inline OTH and the peripheral OTH are comprised of diamond.

11. A laser, comprising:

a plurality of laser gain elements optically coupled to one another, each laser gain element having first and second parallel spaced surfaces, opposing edges, and a longitudinal axis normal thereto, said laser gain elements having a peripheral surface extending between opposing edges of said first and second spaced surfaces and a transverse axis substantially normal thereto and to the longitudinal axis, a longitudinal dimension defining the thickness of the laser gain element between the first and second spaced surfaces and a transverse dimension between opposing edges of said laser gain element along the transverse axis, wherein the transverse dimension is greater than the longitudinal dimension;

a laser cavity having a first reflective surface at a first cavity end and a first partially reflective surface at a second cavity end;

said plurality of laser gain elements having an optical axis through said cavity;

a pump source optically coupled to each of the plurality of laser gain elements, the pump source providing pump energy at a pump wavelength;

the plurality of laser gain elements disposed within the laser cavity between the first and second cavity ends and operative to generate a laser emission having a laser wavelength along said optical axis in response to said pump energy;

each laser gain element being sandwiched between two adjacent inline optically transparent heat transfer media (inline OTHs) with respective faces of said laser gain element being optically and thermally coupled to adjacent faces of respective inline OTHs each inline OTH further including a peripheral surface extending between said first and second face surfaces of the respective inline OTH;

each of the plurality of laser gain elements being arranged within said laser cavity such that the angle formed between the optical axis and the longitudinal axis is substantially equal to the Brewster angle for the inline OTH and the laser gain element;

a heat transfer system including:

a peripheral OTH thermally and optically coupled to said peripheral surface of at least one of the plurality of inline OTHs, wherein the peripheral OTH is substantially optically transparent at the pump wavelength and the laser wavelength; and a heat exchanger thermally coupled to said peripheral OTH;

wherein heat generated within each of the plurality of laser gain elements flows from the faces of the respective laser gain elements into the adjacent inline OTH and through the peripheral OTH for dissipation by the heat exchanger.

12. The apparatus of claim 11 wherein the Brewster angle is measured between the incoming laser emission and the second axis.

13. The apparatus of claim 11 wherein the laser element is a solid state gain medium.

14. The apparatus of claim 13 wherein the solid state gain medium is Nd:YAG.

15. The apparatus of claim 11 wherein the inline OTH and the peripheral OTH are comprised of diamond.

16. A laser, comprising: a laser cavity having a reflective mirror at a first end of the cavity and a partially reflective mirror at a second end of said laser cavity;
 at least one laser gain element disposed in said laser cavity, each of said at least one laser gain element having opposing faces and a peripheral edge;
 a pump source optically coupled to the laser gain medium, the pump source providing pump energy at a pump wavelength;
 the plurality of laser elements disposed within the laser cavity between the first and second reflective surfaces and configured and arranged to receive pump energy and to generate a laser emission parallel along the optical axis;
 a plurality of inline optically transparent heat transfer media (inline OTHs), each inline OTH having opposing faces and a peripheral edge, each of said at least one laser gain element being sandwiched between two of said inline OTHs with said respective faces of said respective laser gain element being optically and thermally coupled faces of said adjacent inline OTHs;
 a heat transfer system including:
  at least one peripheral OTH optically and thermally coupled to the peripheral surface of at least one of the plurality of inline OTHs; and
  a heat exchanger thermally coupled to the peripheral OTH;
  wherein heat generated within the laser element flows from the laser gain element through the inline OTH and peripheral OTH to the heat exchanger for dissipation thereby.

17. The apparatus of claim 16 wherein said opposing faces of said laser gain elements define planes that are non-parallel.

18. The apparatus of claim 17 wherein said laser cavity has an optical axis extending between said first and second cavity ends and said laser gain elements are configured such that the angle between the optical axis and an axis normal to face of each laser gain elements is the Brewster angle.

19. The apparatus of claim 17 wherein the laser gain element is frustrum shaped.

20. The apparatus of claim 19 wherein the first and second surfaces of each of the plurality of laser gain elements are substantially not perpendicular to the optical axis, such that an angle formed between the optical axis first and second surfaces is substantially equal to the Brewster angle.

21. The apparatus of claim 16 wherein the inline OTH and the peripheral OTH are comprised of diamond.

22. The apparatus of claim 16, wherein the laser gain element is a solid state gain medium.

23. The apparatus of claim 22 wherein the laser gain medium is Nd:Yag.

24. The apparatus of claim 16 wherein said opposing faces of said laser gain element are parallel.

25. A method for cooling a laser gain element within a laser cavity, the method comprising the steps of:
 generating a laser emission by the laser gain element within the laser cavity along an optical axis, wherein the laser gain element includes first and second spaced surfaces and a longitudinal axis normal thereto and a peripheral surface extending between said first and second surfaces;
 propagating the laser emission through an anti-reflective mechanism;
 propagating the laser emission through an inline optically transparent heat transfer medium (inline OTH) including first and second spaced face surfaces, wherein said first face surface of said inline OTH optically and thermally coupled to the laser gain element via the anti-reflective mechanism, the inline OTH further including a peripheral surface extending between said first and second spaced face surfaces of said inline OTH;
 generating heat within said laser gain element, the heat flowing from the laser gain element into the inline OTH;
 coupling the heat from peripheral surface of the inline OTH to a peripheral OTH thermally and optically coupled to the peripheral surface of the inline OTH; and
 coupling the heat from the peripheral OTH to a heat exchanger for dissipation thereby.

* * * * *

UNITED STATES PATENT AND TRADEMARK OFFICE
CERTIFICATE OF CORRECTION

PATENT NO. : 6,667,999 B2
DATED : December 23, 2003
INVENTOR(S) : Victor Hasson et al.

It is certified that error appears in the above-identified patent and that said Letters Patent is hereby corrected as shown below:

Column 11,
Line 27, delete "dimension"; and
Line 37, "at a wavelength;" should read -- at a pump wavelength; --.

Signed and Sealed this

Fourth Day of January, 2005

JON W. DUDAS
*Director of the United States Patent and Trademark Office*